US012434955B2

(12) United States Patent
Morgan

(10) Patent No.: US 12,434,955 B2

(45) Date of Patent: Oct. 7, 2025

(54) JAW ATTACHMENT FOR A PALLET LIFT VEHICLE

(71) Applicant: Harold Dewayne Morgan, Attalla, AL (US)

(72) Inventor: Harold Dewayne Morgan, Attalla, AL (US)

( * ) Notice: Subject to any disclaimer, the term of this patent is extended or adjusted under 35 U.S.C. 154(b) by 0 days.

(21) Appl. No.: 18/452,611

(22) Filed: Aug. 21, 2023

(65) Prior Publication Data

US 2025/0066171 A1 Feb. 27, 2025

(51) Int. Cl.
*B66F 9/18* (2006.01)

(52) U.S. Cl.
CPC .................................... *B66F 9/18* (2013.01)

(58) Field of Classification Search
CPC ................ B66F 9/18; B66F 9/12; E02F 3/404
See application file for complete search history.

(56) References Cited

U.S. PATENT DOCUMENTS 3,817,567 A * 6/1974 Lull .......................... B66F 9/18 294/197
4,266,819 A * 5/1981 Pemberton ................ B66F 9/18 294/197
4,354,795 A * 10/1982 Dutra, Jr. ................. B66F 9/18 410/52
4,493,604 A * 1/1985 Walker ...................... B66F 9/18 414/622
4,659,277 A * 4/1987 Widener ................... B66F 9/18 294/197
5,509,774 A * 4/1996 Yoo ........................... B66F 9/18 414/622
6,722,843 B2 * 4/2004 Mensch ................ E02F 3/4133 294/104
6,729,832 B1 * 5/2004 Word, III .............. B66F 9/0655 37/406
6,820,357 B1 * 11/2004 Menard ............. A01D 87/0076 294/201
7,008,167 B2 * 3/2006 Henning ................ B66F 9/143 414/667
7,014,412 B2 * 3/2006 Daniel .................... E02F 3/965 37/406
11,396,445 B2 * 7/2022 Maldonado Nicolás .................... B66F 9/146
2009/0104012 A1 * 4/2009 Daniel ...................... B66F 9/18 414/729
2015/0042116 A1 * 2/2015 Jacobson .................. E02F 3/40 294/197
2021/0156002 A1 * 5/2021 Taylor ...................... C21D 9/50

* cited by examiner

*Primary Examiner* — Anna M Momper
*Assistant Examiner* — Michelle M Mudwilder
(74) *Attorney, Agent, or Firm* — George P. Kobler

(57) ABSTRACT

A jaw attachment for a pallet lift vehicle includes an attachment member with a vertical portion from which extend upper and lower opposing flanges which form a channel for receiving upper and lower cross bars of a pallet fork. A tine member extends horizontally the vertical portion. A vertical stanchion is attached to the front of the attachment member vertical portion. A jaw member is pivotally attached at one end to the lower portion of said vertical stanchion and a bi-directional actuator is pivotally attached at one end to a top portion of the stanchion and pivotally attached at a second end to the jaw member such that activation of the actuator pivots the jaw member vertically in relation to the tine member.

6 Claims, 5 Drawing Sheets

JAW ATTACHMENT FOR A PALLET LIFT VEHICLE

BACKGROUND

Summary

For purposes of summary, certain aspects, advantages, and novel features are described herein. It is to be understood that not necessarily all such advantages may be achieved in accordance with any one particular embodiment. Thus, the apparatuses or methods claimed may be embodied or carried out in a manner that achieves or optimizes one advantage or group of advantages as taught herein without necessarily achieving other advantages as may be taught or suggested herein.

In one aspect, the jaw attachment includes an attachment member for mounting the jaw attachment to the pallet fork of a pallet lift vehicle. The attachment member comprises a vertical portion from which extend upper and lower opposing flanges which form a channel for receiving upper and lower cross bars of the pallet fork. A tine member extends horizontally from the vertical portion of the attachment member. A vertical stanchion is attached to the front of the attachment member vertical portion. A jaw member is pivotally attached at one end to the lower portion of said vertical stanchion and a bi-directional actuator is pivotally attached at one end to a top portion of the stanchion and pivotally attached at a second end to the jaw member such that activation of the actuator pivots the jaw member vertically in relation to the tine member.

BRIEF DESCRIPTION OF THE DRAWINGS

The jaw attachment for a pallet lift vehicle is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

The various embodiments of the jaw attachment and their advantages are best understood by referring to FIGS. 1 through 5 of the drawings. The elements of the drawings are not necessarily to scale, emphasis instead being placed upon clearly illustrating the novel features and principles of operation. Throughout the drawings, like numerals are used for like and corresponding parts of the various drawings.

Furthermore, reference in the specification to "an embodiment," "one embodiment," "various embodiments," or any variant thereof means that a particular feature or aspect described in conjunction with the particular embodiment is included in at least one embodiment. Thus, the appearance of the phrases "in one embodiment," "in another embodiment," or variations thereof in various places throughout the specification are not necessarily all referring to its respective embodiment.

Figure 1:
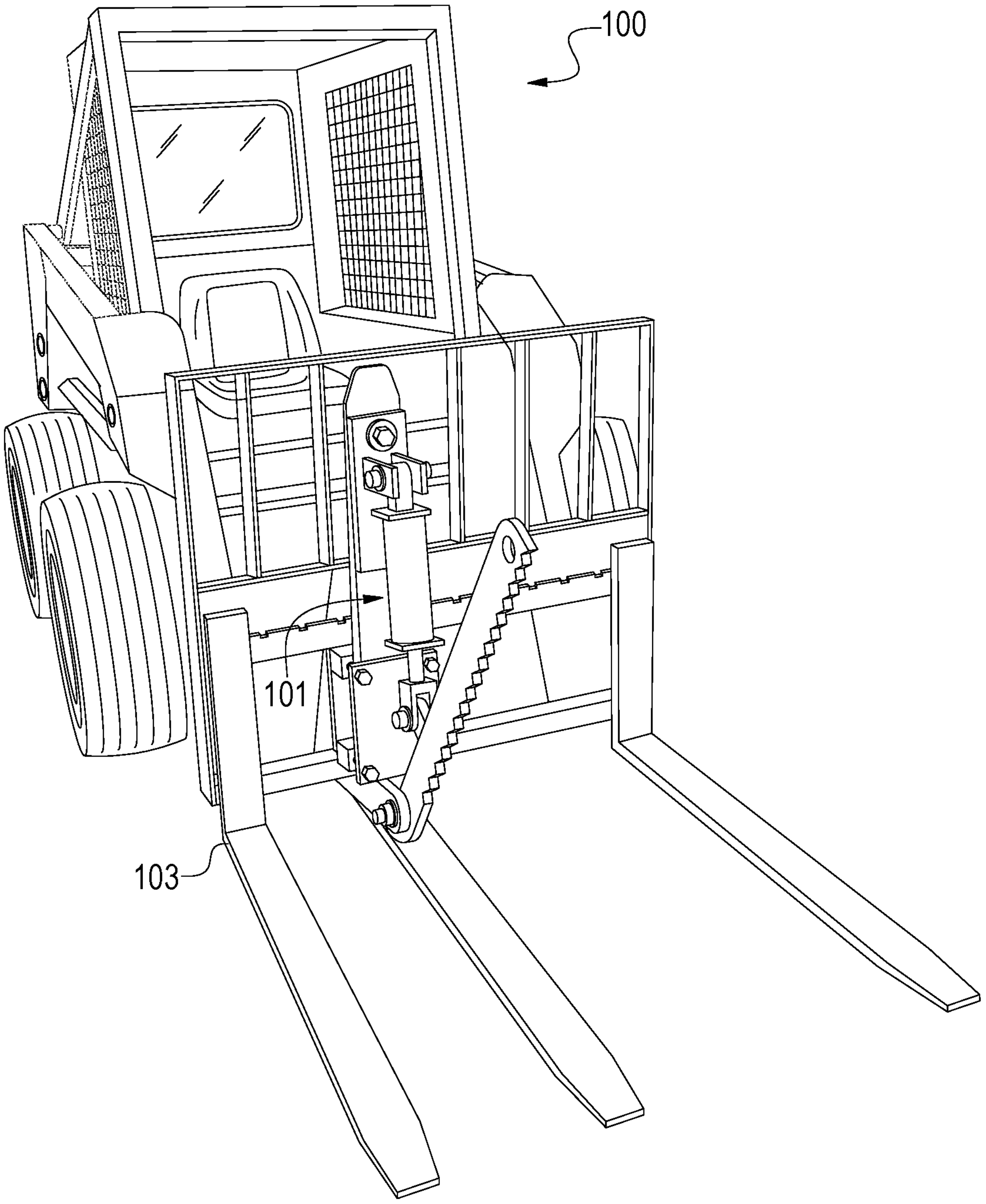
FIG. 1 depicts a pallet lift vehicle with an exemplary jaw attachment.

FIG. 1 illustrates vehicle 100 with an exemplary jaw attachment 101 installed on a pallet fork 103. Vehicle 100 may be a skid steer, or a tractor, or any heavy equipment that may include a pallet lifting fork.

Figure 2:
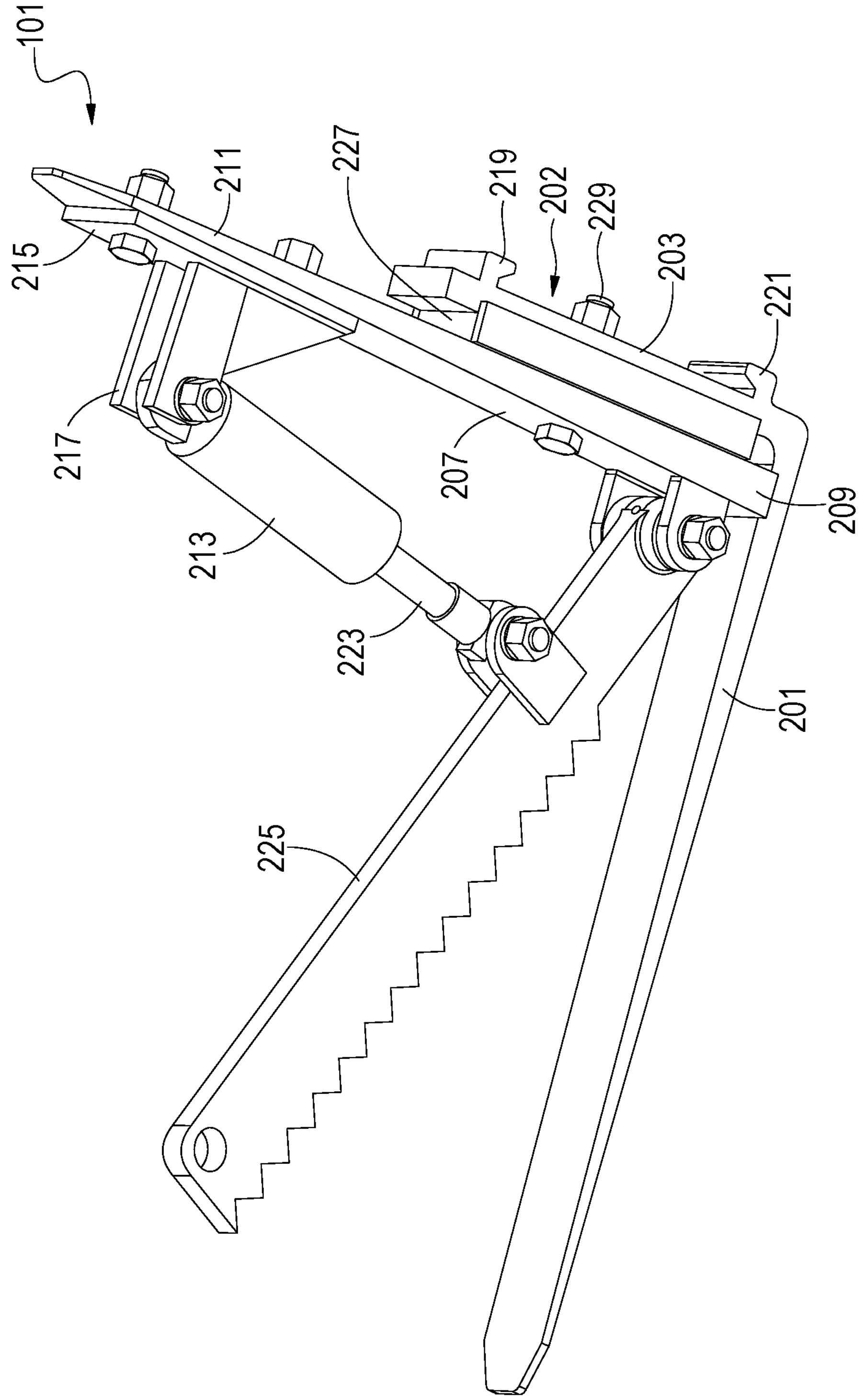
FIG. 2 illustrates an exemplary jaw attachment according to a first embodiment.

FIG. 2 depicts an exemplary jaw attachment 101 comprising tine member 201 extending perpendicularly from a vertical attachment plate 203. Attachment plate 203 comprises upper and lower opposing flanges 219, 221 that define a channel 202. A vertically oriented stanchion 207 extends perpendicularly from a rear portion of tine member 201 and comprises a base portion 209 and a top portion 211. In a preferred embodiment, the top portion 211 is tapered in thickness compared to the base portion 209 in order to allow the stanchion to flex during operation. Stanchion 207 is attached to vertical attachment plate 203 with one or more bolts 229.

Actuator 213 is pivotally coupled at an upper end via linkage 217 to upper plate 215 which is attached to top portion 211 of stanchion 207. It will be appreciated that actuator 213 may be hydraulic or pneumatic. Piston 223 extends downward from the lower end of actuator 213 and is pivotally coupled at its lower end to jaw member 225 toward the rear portion thereof. Jaw member 225 includes a rear end that is pivotally attached to base portion 209 of stanchion 207 such that actuation of piston 223 by actuator 213 opens or closes jaw member 225 with respect to tine member 201. Spacer block 227 is interposed between the back of stanchion 207 and vertical attachment plate 203.

Figure 3:
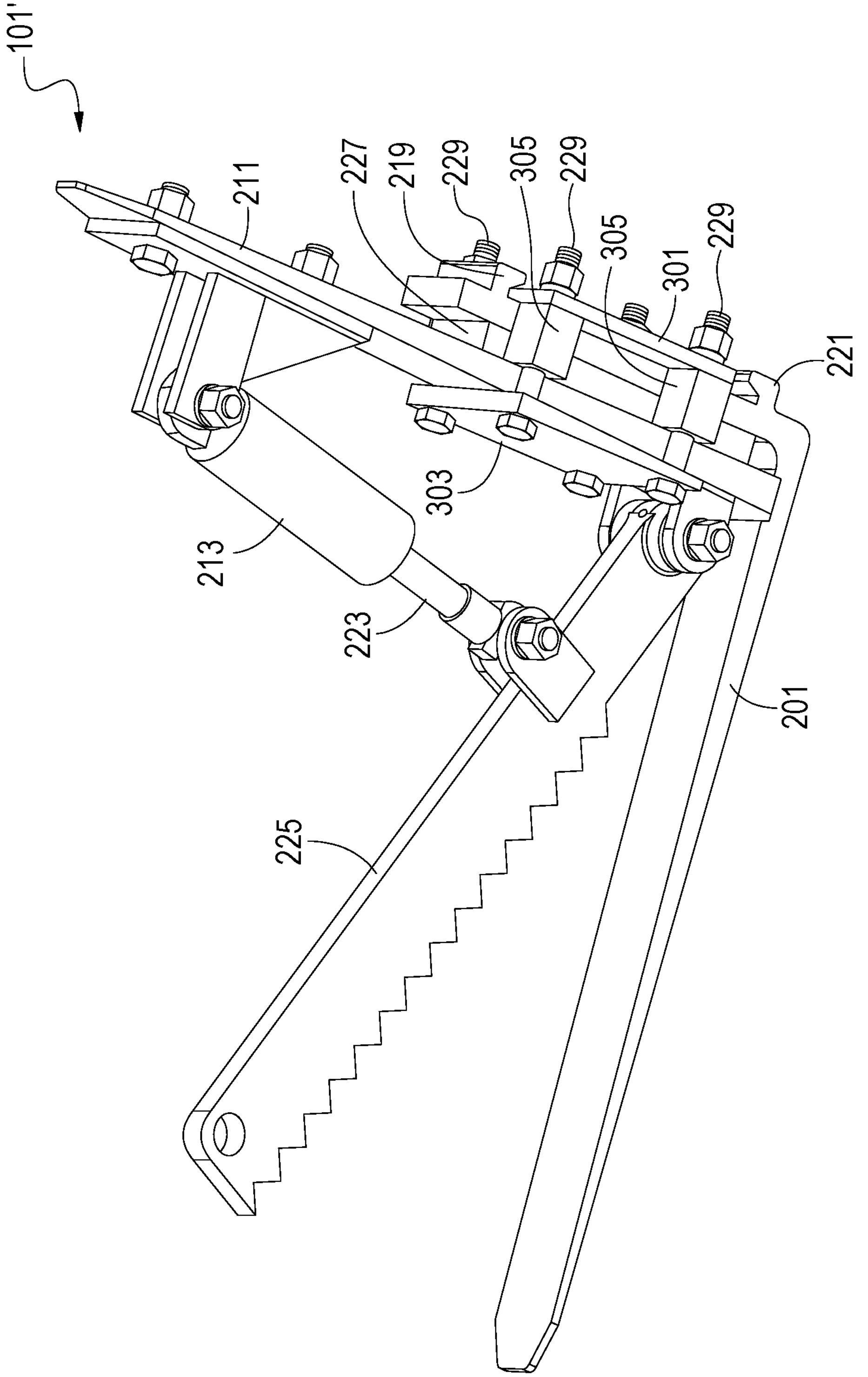
FIG. 3 shows an exemplary jaw attachment according to another embodiment.

FIG. 3 shows a variation of jaw attachment 101' where a backing plate 301 is seated within channel 202 and a front plate 303 is secured to the front of stanchion 207 with bolts 229 coupling backing plate 301 to front plate 303. Bolts 229 may be inserted through spacer nuts 305.

Figure 4:
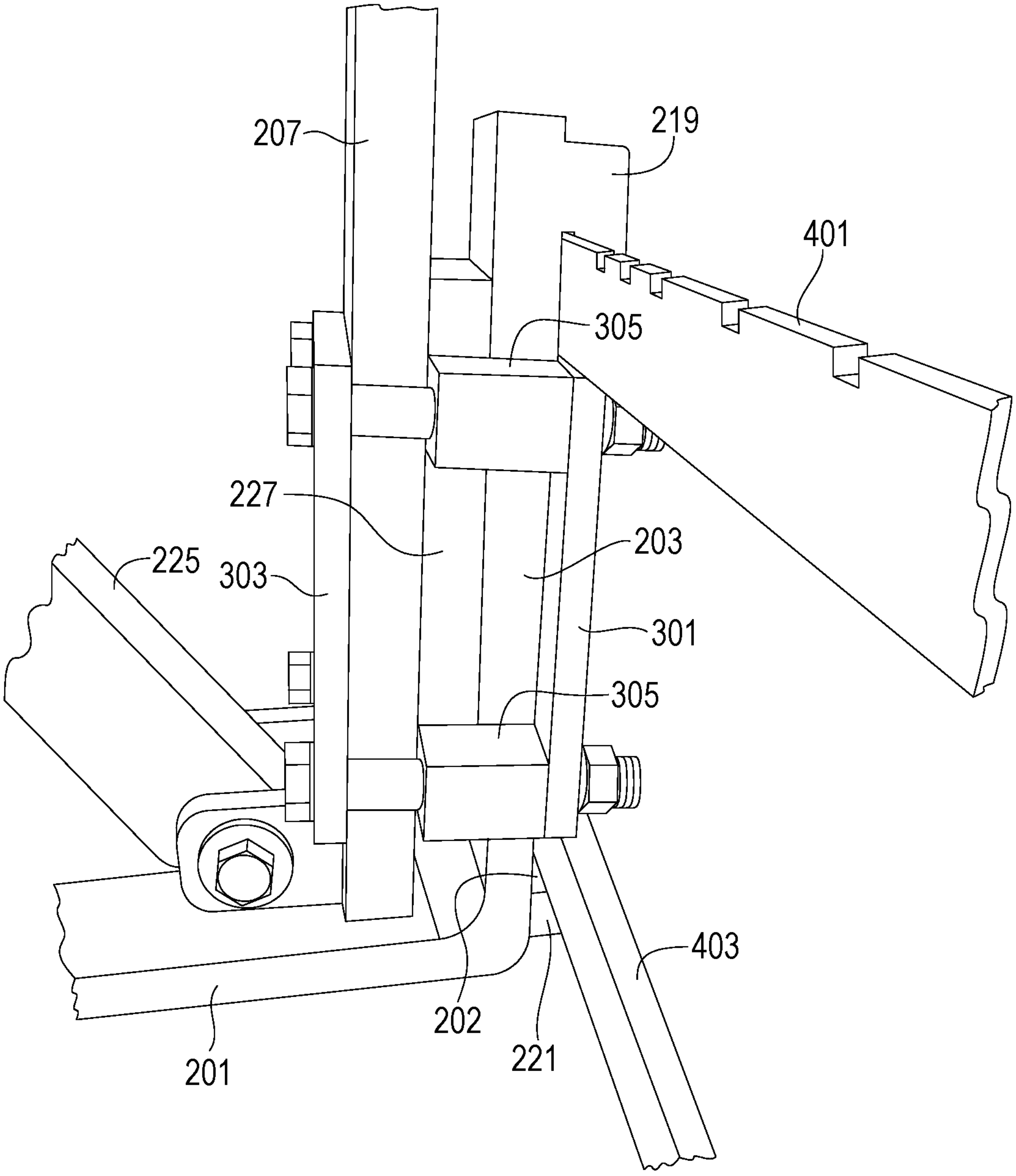
FIG. 4 is an isolated view of the rear portion of the jaw attachment mounted to the pallet lifting fork of a pallet lift vehicle.

FIG. 4 is an isolated view of the rear of jaw attachment 101 installed on a pallet fork 103 which comprises an upper cross beam 401 and a lower cross beam 403. Upper flange 219 of vertical attachment member 203 rests over upper cross beam 401 of the pallet fork 103 while lower cross beam 403 is seated on top of lower flange 221 such that the upper and lower cross beams 401, 403 seated within the upper and lower portions, respectively, of channel 202. Backing plate 301 is seated between upper and lower cross beams 401, 403. The top end of backing plate 301 abuts the bottom edge of upper cross beam 401 and the bottom end of backing plate 301 rests on the top edge of lower cross beam 403. In this configuration, backing plate 301 provides structural support to cross beams 401, 403 in order to prevent them from bending.

Figure 5:
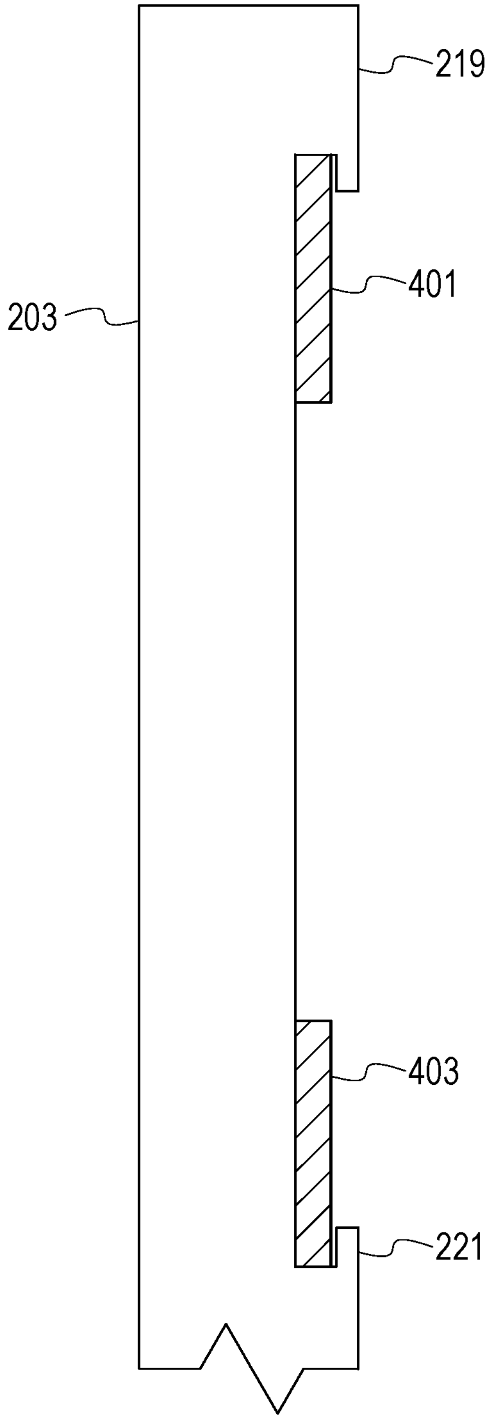
FIG. 5 is a cross-section view showing engagement of the attachment member flanges with the upper and lower cross bars of the pallet fork.

FIG. 5 is a cross-section view of the vertical attachment plate showing engagement of the upper and lower flanges 219, 221 with upper and lower cross beams 401, 403.

As described above and shown in the associated drawings, the present invention comprises a jaw attachment for a pallet lift vehicle. While particular embodiments have been described, it will be understood, however, that any invention appertaining to the apparatus/system/method described is not limited thereto, since modifications may be made by those skilled in the art, particularly in light of the foregoing teachings. It is, therefore, contemplated by the appended claims to cover any such modifications that incorporate those features or those improvements that embody the spirit and scope of the invention.

What is claimed is:

1. A jaw attachment for a pallet lift vehicle, said pallet lift vehicle having a pallet lifting fork with upper and lower cross bars, said jaw attachment assembly comprising:

an attachment member configured to be removably attached to the pallet lifting fork and comprising a vertical portion from which extends upper and lower opposing flanges, said opposing flanges forming a channel for receiving said upper and lower cross bars, and a tine member extending horizontally from a base of said vertical portion;

a vertical stanchion attached to said vertical portion and extending vertically from said tine member, the vertical stanchion having a top portion and a lower portion and wherein said top portion is tapered with respect to said lower portion in order to allow the stanchion to flex during operation;

a jaw member pivotally attached at one end to the lower portion of said vertical stanchion;

a bi-directional actuator having a first end pivotally attached to the top portion of said stanchion and a second end pivotally attached to said jaw member such that activation of said actuator pivots said jaw member vertically in relation to said tine member.

2. The jaw attachment of claim 1, further comprising a spacer block interposed between said vertical stanchion and said vertical portion of said attachment member.

3. The jaw attachment of claim 1, further comprising one or more bolts for fastening said vertical portion of said attachment member to said vertical stanchion.

4. The jaw attachment of claim 3, further comprising a front plate affixed to a front of said lower portion of said vertical stanchion.

5. The jaw attachment of claim 4, further comprising a backing plate seated within said channel.

6. The jaw attachment of claim 5, further comprising spacer nuts through which said one or more bolts is inserted.

* * * * *